United States Patent [19]

Fernandez

[11] Patent Number: 5,005,777
[45] Date of Patent: Apr. 9, 1991

[54] SEAT BELT RETRACTOR WITH AN ELECTRIC MOTOR

[76] Inventor: Angel Fernandez, 36794 Harper, Apt. 301, Mt. Clemens, Mich. 48043

[21] Appl. No.: 282,744

[22] Filed: Dec. 9, 1988

[51] Int. Cl.$^5$ .................. A62B 35/00; B65H 75/48
[52] U.S. Cl. ...................... 242/54 R; 242/107; 280/807
[58] Field of Search ............ 242/54, 55, 107–107 AR; 280/806–808; 180/268, 269; 297/475–479

[56] References Cited

U.S. PATENT DOCUMENTS

| | | | |
|---|---|---|---|
| 4,529,143 | 7/1985 | Kanada et al. | |
| 4,546,933 | 10/1985 | Kanada et al. | |
| 4,570,872 | 2/1986 | Tsujimura et al. | |
| 4,572,543 | 2/1986 | Tsuge et al. | 280/807 |
| 4,588,144 | 5/1986 | Nishimura | |
| 4,630,841 | 12/1986 | Nishimura et al. | |
| 4,655,312 | 4/1987 | Frantom et al. | |
| 4,659,108 | 4/1987 | Sack et al. | |
| 4,796,918 | 1/1989 | Meyer et al. | 280/806 |

*Primary Examiner*—Stuart S. Levy
*Assistant Examiner*—Steven M. duBois
*Attorney, Agent, or Firm*—Tarolli, Sundheim & Covell

[57] ABSTRACT

A seat belt retractor includes a spool driven by an electric motor. Seat belt webbing is wound around the spool. A worm wheel rotates with the spool and meshes with a worm that is axially movable. A set of electrical brushes is axially movable with the worm along the shaft. The set of electrical brushes is electrically coupled to a control circuit through a set of conductor strips. The set of brushes slide along the set of conductor strips as the worm moves axially. In response to movement of the brushes along the conductor strips, the control circuit provides signals to control the motor and, thus, the spool.

When an occupant initially withdraws the webbing to buckle the webbing, the tension force acting on the webbing moves the worm axially. In response, the motor is actuated to rotate the spool in the belt withdrawal direction and provide motorized assist for the webbing withdrawal. After the tension force acting on the webbing decreases below a predetermined amount and a predetermined time elapses, the motor rotates the spool in the belt retraction direction and tightens the webbing against the occupant. After the webbing tightens against the occupant with a predetermined amount of force, the motor rotates the spool in the belt withdrawal direction until a small amount of slack in the webbing is established. While the webbing is buckled, if the occupant moves so as to form excess slack in the webbing, then this sequence of retracting the webbing against the occupant and paying out the small amount of webbing is repeated. If a crash occurs while the webbing is buckled, then the meshing engagement of the worm wheel with the worm prevents the worm wheel and the spool from rotating and locks the retractor.

21 Claims, 6 Drawing Sheets

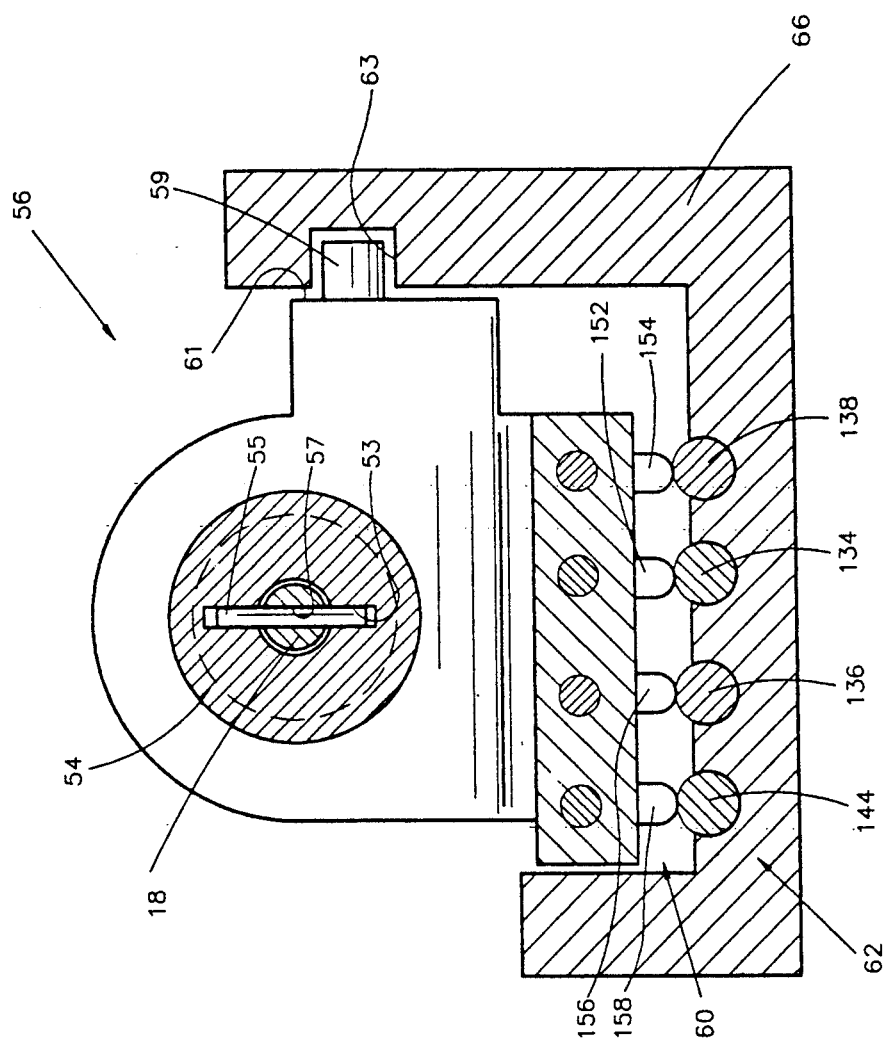
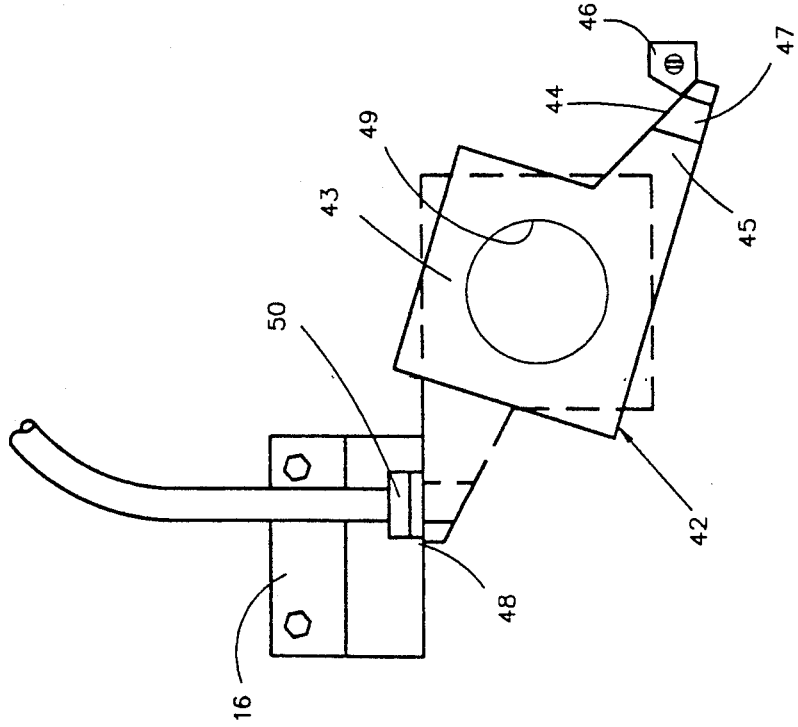
FIG. 5
FIG. 4

SEAT BELT RETRACTOR WITH AN ELECTRIC MOTOR

BACKGROUND OF THE INVENTION

1. Technical Field

The present invention relates to a seat belt retractor for use by an occupant of a vehicle, and particularly to a seat belt retractor having a spool which is driven by an electric motor.

2. Background Art

A known seat belt retractor having a spool driven by an electric motor is disclosed in U.S. Pat. No. 4,659,108. The retractor includes a spool and seat belt webbing wound around the spool. A tongue is connected to the webbing and is insertable into a buckle attached to the vehicle after the webbing is drawn around an occupant. The occupant must overcome the inertia of the motor while manually withdrawing the webbing from the retractor to insert the tongue into the buckle. The motor is actuated to rotate the spool in the belt retraction direction in response to the tongue being inserted into the buckle. Thus, the webbing begins to tighten against the occupant. As the webbing tightens against the occupant, the tension in the webbing increases. When the tension increases to a sufficient amount, the motor is deactuated. After a predetermined time delay, the motor is actuated to rotate the spool in the belt withdrawal direction for a sufficient time period to pay out a small amount of webbing. The payout of the webbing relieves the force applied by the webbing against the occupant. In the event of a crash condition, a conventional inertia actuated locking pawl engages the teeth of ratchet wheels connected to the spool so as to lock the spool against rotation in the belt withdrawal direction.

Another known seat belt retractor having a spool driven by an electric motor is disclosed in U.S. Pat. No. 4,655,312. The retractor includes a spool and seat belt webbing wound around the spool. A tongue is connected to the webbing and is latchable to a buckle attached to the vehicle after the webbing is drawn around an occupant. The occupant must overcome the inertia of the motor while manually withdrawing the webbing from the retractor to latch the tongue to the buckle. The motor is actuated to rotate the spool in a belt retraction direction in response to the tongue being latched to the buckle. Thus, the webbing begins to tighten against the occupant. While the webbing tightens against the occupant, the tension in the webbing increases. When the tension in the webbing increases above a predetermined amount, the motor is actuated to rotate the spool in a belt withdrawal direction. The spool rotates for a time period sufficient to pay out a relatively small predetermined amount of webbing. Slack is thereby established in the webbing. The motor is deactuated after the slack in the webbing is established. In the event of a crash condition, a conventional inertia actuated locking pawl engages the teeth of ratchet wheels attached to the spool. The spool of the retractor is thereby locked to prevent movement of the webbing in the belt withdrawal direction.

SUMMARY OF THE INVENTION

In a preferred embodiment of the present invention, the retractor includes a frame and a spool driven by a reversible electric motor. The spool is supported for rotation about its longitudinal central axis by the frame. Seat belt webbing is wound around the spool. A worm wheel is fixed with the spool for rotation with the spool. The motor drives a shaft which is supported for rotation about its longitudinal central axis by the frame of the retractor. A worm in meshing engagement with the worm wheel encircles the shaft and is rotatable with the shaft about the longitudinal central axis of the shaft. The worm is also axially slidable along the longitudinal central axis of the shaft.

The motor is actuatable to rotate the shaft in either direction in response to electrical signals from a control circuit. When the motor is actuated to rotate the shaft in one direction, the worm and worm wheel rotate the spool in the belt withdrawal direction. When the motor is actuated to rotate the shaft in the other direction, the worm and worm wheel rotate the spool in the belt retraction direction.

A spring biases the worm axially to an initial position relative to the shaft. When no tension is applied to the webbing, the worm is normally in its initial position. When tension is applied to the webbing, the worm slides along the axial extent of the shaft against the spring bias in direct response to the tension applied to the webbing. The amount of sliding of the worm along the shaft depends upon the amount of tension applied to the webbing. As the tension applied to the webbing decreases, the worm slides back toward its initial position relative to the shaft.

A brush holder is fixed to the worm and is movable with the worm relative to the shaft. A set of electrical brushes is mounted on the brush holder. Each brush engages a respective electrical conductor strip mounted on the frame of the retractor. Each conductor strip includes a number of electrically insulated segments. When the brush holder is moved with the worm along the shaft, each brush slides across the segments of the associated conductor strip. Each segment is electrically connected to the control circuit. The control circuit controls the motor in response to electrical signals generated as a result of the brushes sliding across the segments of the conductor strips.

A tongue is connected to the webbing and is insertable into a buckle attached to the vehicle. The webbing is herein referred to as being "buckled" when the tongue is inserted in the buckle. When an occupant initially withdraws the webbing to buckle the webbing, a tension force acts on the webbing in the belt withdrawal direction. This tension force results in axial movement of the worm and the brush holder in the direction against the bias of the spring. When the tension force acting on the webbing increases above a first predetermined amount of force, the brushes engage the segments of their respective conductor strips to actuate the motor to rotate the spool in the belt withdrawal direction. Motorized assist of withdrawal of the webbing is thereby provided.

After the webbing is buckled, the tension force acting on the webbing decreases. When the tension force acting on the webbing decreases below a second predetermined amount of force and a time delay provided by a timing device elapses, the motor is actuated to rotate the spool in the belt retraction direction. The webbing then begins to tighten against the occupant. The webbing begins to tighten against the occupant only after the webbing tension decreases below the second predetermined amount of force and the time delay provided by the timing device elapses. The time delay provides time for the occupant to buckle the webbing before the motor is actuated to rotate the spool in the belt retraction direction.

The motor continues to rotate the spool in the belt retraction direction until the webbing cannot retract any farther due to the tightness of the webbing against the occupant. The tension force acting on the webbing increases as the webbing is tightening against the occupant. As the tension force increases, the worm and the brush holder move in the direction against the bias of the spring. When the tension force acting on the webbing increases above a third predetermined amount of force, the brushes engage the segments of their respective conductor strips to deactuate the motor.

After the motor is deactuated, the bias of the spring urges the worm and the brush holder to their initial axial position relative to the shaft. As the worm and the brush holder move toward the initial position, the brushes engage their respective conductor strips to actuate the motor to rotate the spool in the belt withdrawal direction to pay out a small amount of the webbing. Tightness of the webbing against the occupant is thereby relieved. The motor is then deactuated.

If movements of the occupant should result in excess slack in the webbing while the webbing is buckled, then the sequence of retracting the webbing against the occupant and paying out the small amount of the webbing, as described hereinabove, is repeated. Thus, the movements of the occupant are tracked and any excess slack in the webbing is removed. By tracking the movements of the occupant and removing excess slack, the occupant is continuously protected.

In the event of a crash condition, the tension in the webbing increases due to the occupant moving against the webbing. The tension on the webbing causes the spool to try to rotate in the belt withdrawal direction. The spool cannot rotate, however, because the worm wheel, which is attached to the spool, is unable to rotate the worm. This occurs because of the helix angle of the worm and the pressure angle of the worm engaging with the worm wheel. The increased tension also causes the worm and the brush holder to move in the direction against the bias of the spring to a predetermined axial position relative to the shaft. The brushes engage their respective conductor strips in a manner which does not actuate the motor. After the worm and the brush holder move to the predetermined axial position relative to the shaft, the meshing engagement of the worm and the worm wheel continues to prevent the worm wheel and the spool from rotating. Thus, when a crash occurs, the meshing engagement of the teeth of the worm and worm wheel locks the spool from rotating in the belt withdrawal direction.

BRIEF DESCRIPTION OF THE DRAWINGS

The foregoing and other features and advantages of the present invention will become apparent to one skilled in the art to which the present invention relates from reading the following description of preferred embodiments in conjunction with the accompanying drawings, wherein:

FIG. 4 is an enlarged, fragmentary view of a portion of the seat belt retractor of FIG. 1;

FIG. 5 is a sectional view of the retractor of the present invention taken approximately along line 5—5 of FIG. 2;

DESCRIPTION OF SPECIFIC EMBODIMENTS OF THE INVENTION

Figure 1:
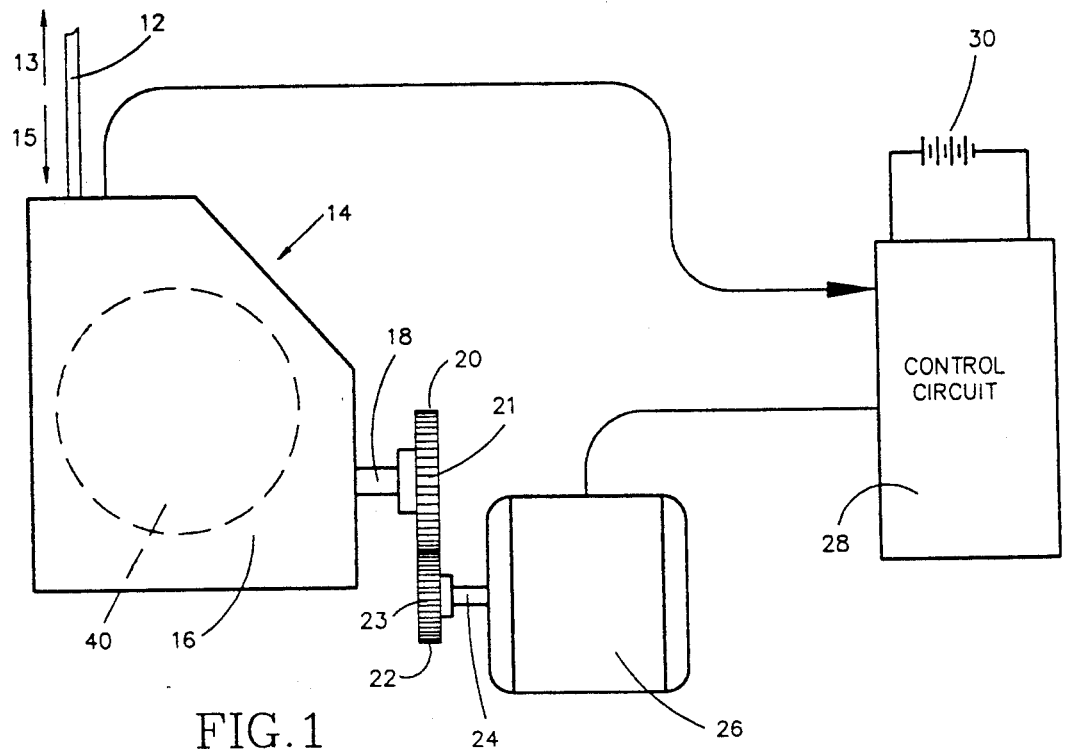
FIG. 1 is a schematic block diagram illustrating a seat belt retractor in accordance with the present invention.

The present invention relates to a seat belt retractor for use by a vehicle occupant. The construction of the retractor may vary. As representative of the present invention, FIG. 1 illustrates a seat belt retractor 14. The retractor 14 includes a frame 16 and a seat belt spool 40. The spool 40 is supported for rotation about its longitudinal central axis at its two ends by the frame 16. Seat belt webbing 12 is wound around the spool 40. The webbing 12 is movable in a belt withdrawal direction 13 or in a belt retraction direction 15 depending upon the direction of rotation of the spool 40.

A shaft 18, which when driven, rotates the spool 40, is supported for rotation about its longitudinal central axis by the frame 16. The shaft 18 is mechanically coupled to a drive gear 20. Teeth 21 of the drive gear 20 are in meshing engagement with gear teeth 23 of a gear 22. The gear 22 is mechanically coupled to an output shaft 24 of a reversible electric motor 26.

When the output shaft 24 of the motor 26 rotates in one direction, the shaft 18 rotates in a direction to rotate the spool in the belt withdrawal direction 13. When the output shaft 24 of the motor 26 rotates in the other direction, the shaft 18 rotates in a direction to rotate the spool 40 in the belt retraction direction 15. The motor 26 is actuated in response to electrical signals provided by a control circuit 28.

The control circuit 28 is connected to a source of electrical energy 30 such as a vehicle battery. The control circuit 28 is responsive to electrical signals from the retractor 14. Thus, in response to electrical signals from the retractor 14, the control circuit 28 provides an electrical signal to control the motor 26. Movement of the webbing 12 in either the belt withdrawal direction 13 or the belt retraction direction 15 is thereby controlled.

Figure 2:
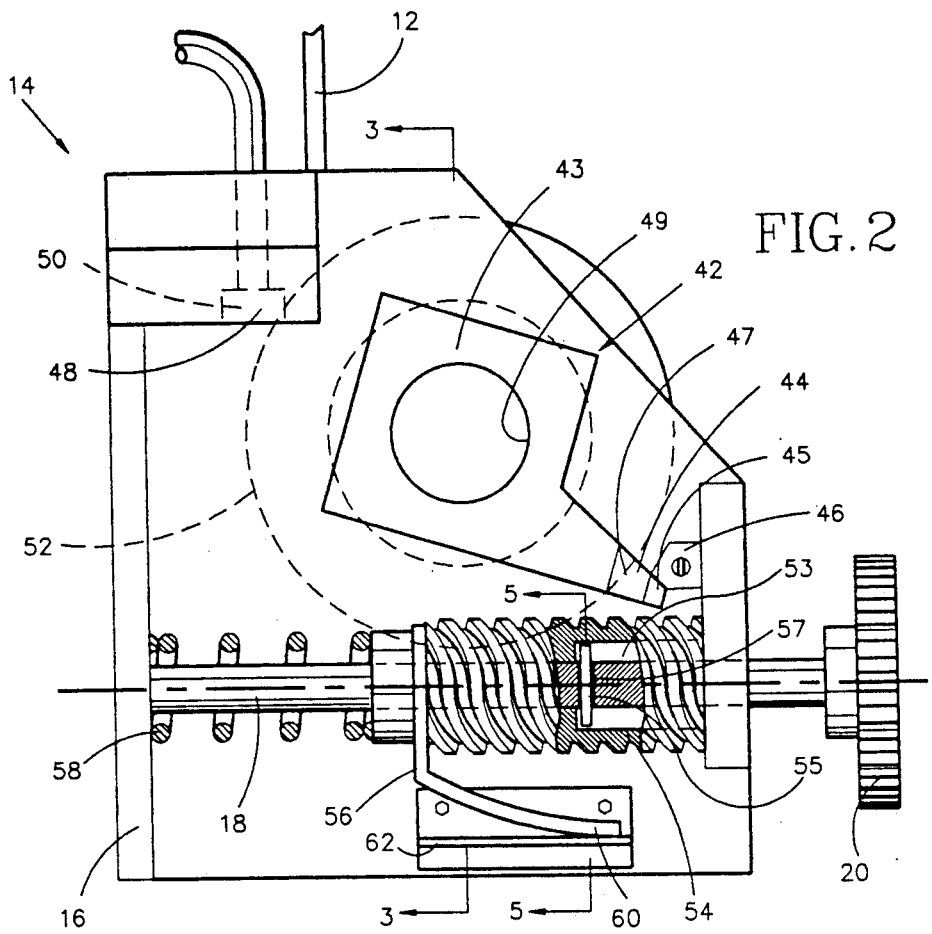
FIG. 2 is an enlarged, fragmentary, side view of the seat belt retractor of FIG. 1 illustrating one position of a worm and worm wheel embodied in the retractor.
Figure 3:
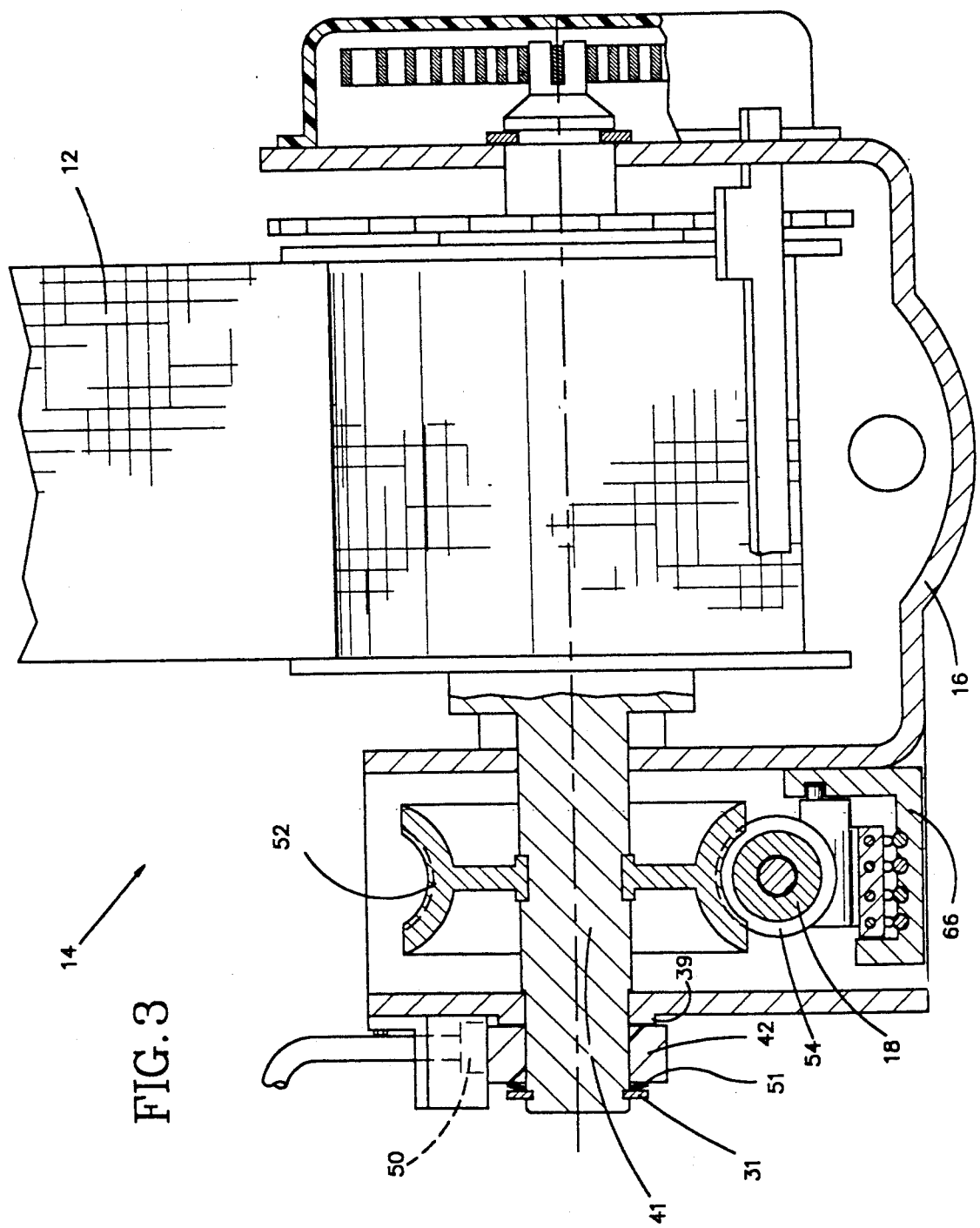
FIG. 3 is a sectional view of the seat belt retractor taken approximately along line 3—3 of FIG. 2.

Referring to FIGS. 2 and 3, a worm wheel 52 is fixed to an extended shaft portion 41 of the spool 40. The portion 41 could be a separate shaft fixed for rotation with the spool 40. The worm wheel 52 is in meshing engagement with a worm 54. The worm 54 encircles the shaft 18 and drives the worm wheel 52. The worm 54 is axially slidable along the longitudinal central axis of the shaft 18. The worm 54 has an axial, diametral slot 53 at its end nearest the drive gear 20. A pin 55 is pressed into a hole 57 in the shaft 18. The pin 55 extends into the slot 53 in the worm 54. Thus, when the shaft 18 rotates, the worm 54 rotates.

The axial length of travel of the worm 54 on the shaft 18 is slightly shorter than the axial length of the slot 53 on the worm 54. The axial length of the slot 53 in the worm 54 and the location of the pin 55 on the shaft 18 are such that the shaft 18 rotates the worm 54 for all axial positions of the worm 54. The frame 16 limits the axial length of travel of the worm 54 on the shaft 18.

A coil spring 58 encircles and is coaxial with the shaft 18. One end of the spring 58 abuts the frame 16 of the retractor 14. The other end of the spring abuts a brush holder 56 which, in turn, abuts the worm 54. The spring 58 exerts an axial force against the worm 54 to bias the worm 54 toward the drive gear 20. As illustrated in FIG. 2, this is toward the right.

The brush holder 56 (FIG. 5) is movable together with the worm 54 axially along the length of the shaft 18. The brush holder 56 has a projection 59 (FIG. 5) extending laterally from a surface 61 into an axially extending groove 63 formed in a conductor holder 66 mounted on the frame 16. The projection 59 and groove 63 prevent the brush holder 56 from rotating about the longitudinal central axis of the shaft 18.

The brush holder 56 has a set 60 of four brushes mounted thereto. Each brush of the set 60 of brushes engages a respective conductor strip of a set 62 of conductor strips. The set 62 of conductor strips are arranged in a side-by-side relationship in the conductor holder 66. Each conductor has a number of electrically insulated segments. The set 60 of brushes are electrically coupled to the control circuit 28.

Figure 6:
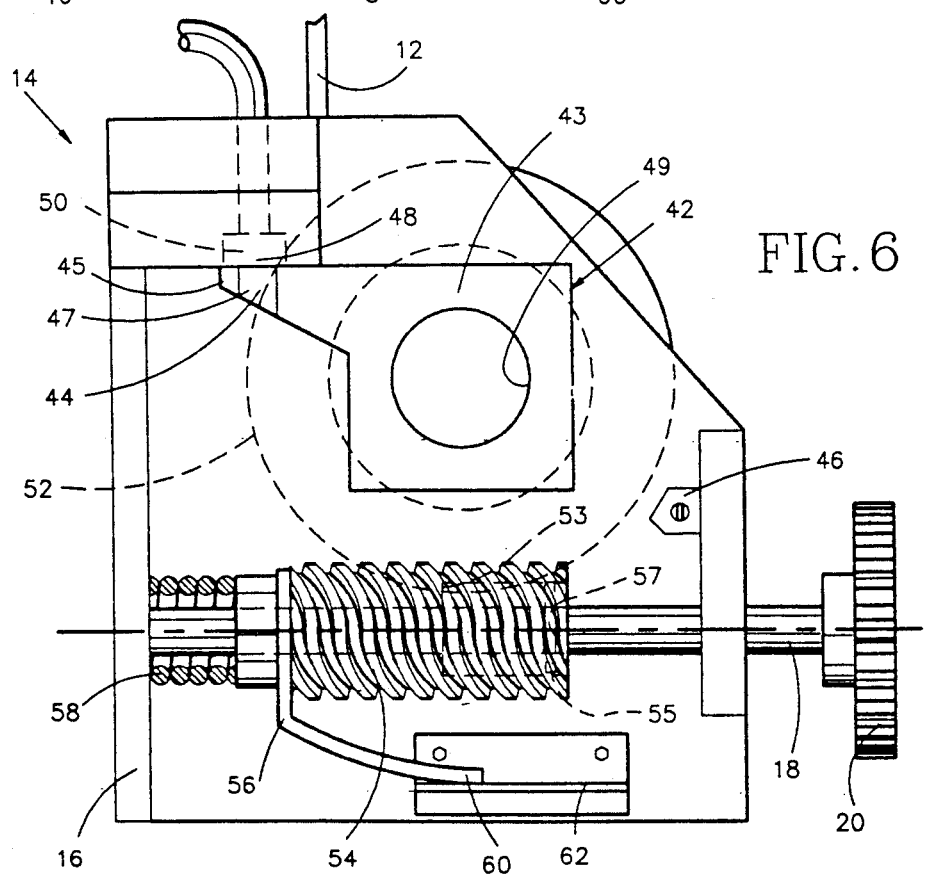
FIG. 6 is a view similar to FIG. 2 but illustrating parts in different positions.

The worm 54 and the brush holder 56 are shown in FIG. 6 in a position in which they have moved against the bias of the spring 58. As illustrated in FIG. 6, this is toward the left. When the worm 54 and the brush holder 56 move axially, the set 60 of brushes mounted on the brush holder 56 slide along their respective conductor strips. As the brushes engage different segments of their respective conductor strips, different electrical connections are provided.

Referring to FIGS. 3 and 4, one end 43 of a holder arm 42 constructed of a nonmagnetic material is frictionally coupled to the extended portion 41 of the spool 40. Specifically, a bore 49 is formed in the end 43 of the holder arm 42. The diameter of the bore 49 is slightly larger than the diameter of the extended portion 41 of the spool 40. The extended portion 41 of the spool 40 is inserted through the bore 49 of the holder arm 42 so that one side of the holder arm 42 abuts a shoulder 39 on the extended portion 41 of the spool 40. A disc spring 51 rotatable with the extended portion 41 of the spool 40 exerts a thrusting force against the other side of the holder arm 42. The disc spring 51 is retained on the portion 41 by a retaining ring 31. When the spool 40 rotates, the holder arm 42 is frictionally driven with the extended portion 41 of the spool 40. The friction is provided by the thrusting force of the disc spring 51 against the holder arm 42.

The other end 45 of the holder arm 42 has connected to it a magnet holder 44. A magnet 47 is mounted on the magnet holder 44. When the holder arm 42 is frictionally driven with the extended portion 41 of the spool 40, the holder arm 42 rotates to move the magnet 47 between two limit stops 46, 48. At the limit stop 48, the magnet 47 is located near a Hall effect sensor 50 rigidly mounted to the frame 16. The other limit stop 46 is located away from the Hall effect sensor 50. When the magnet 47 is at the stop 48 near the Hall effect sensor 50, the Hall effect sensor 50 is energized and provides an electrical signal to the control circuit 28.

Figure 7:
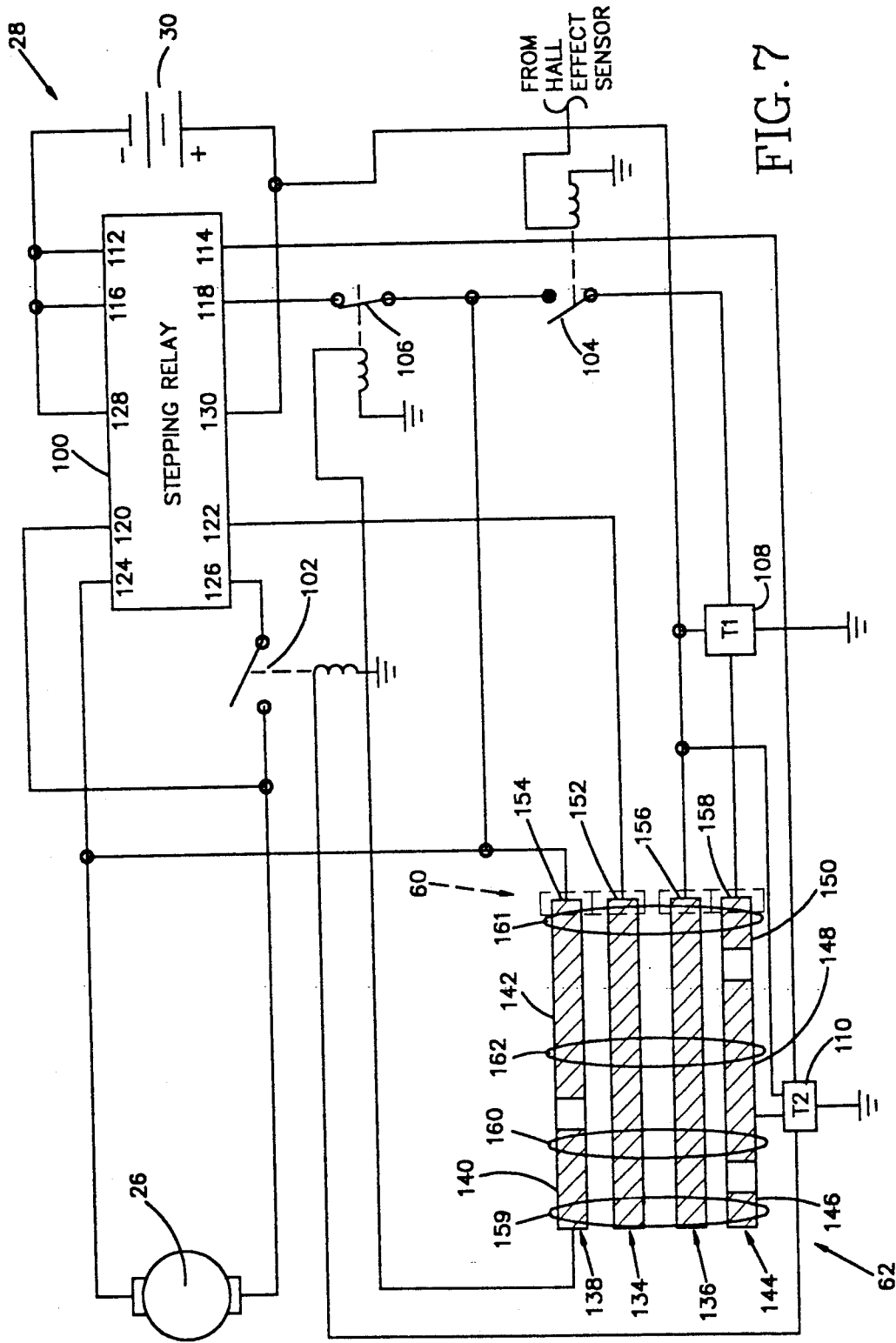
FIG. 7 is a schematic diagram illustrating an embodiment of an electronic control circuit embodied in the seat belt retractor of FIG. 1.

Referring to FIG. 7, the control circuit 28 includes: (1) a stepping relay 100, (2) two normally open, electrically actuatable relay switches 102, 104, (3) one normally closed electrically actuatable relay switch 106, and (4) two time delay devices 108, 110. The stepping relay 100 is conventional and functions in a manner well known in the art.

The stepping relay 100 has two sets of input terminals and two sets of output terminals. One set of input terminals to the relay 100 includes terminals 112 and 114, hereinafter referred to as the first input. Terminal 112 is connected to the negative terminal of the battery 30. The other set of input terminals to the relay 100 includes terminals 116 and 118, hereinafter referred to as the second input. Terminal 116 is also connected to the negative terminal of the battery 30.

The relay 100 includes one set of output terminals 124 and 126, hereinafter referred to as the first output. Another set of output terminals of the relay 100 includes terminals 120 and 122, hereinafter referred to as the second output. The relay 100 also includes terminals 128 and 130. Terminal 128 is connected to the negative terminal of the battery 30. Terminal 130 is connected to the positive terminal of the battery 30.

When a voltage substantially equal to the voltage of the battery 30 is applied to the first input (terminals 112, 114), the voltage of the battery 30 is available at the first output (terminals 124, 126). Similarly, when a voltage substantially equal to the voltage of the battery 30 is applied to the second input (terminals 116, 118), the voltage of the battery 30 is available at the second output (terminals 120, 122). The polarity is positive at terminal 126 with respect to terminal 124 when the voltage of the battery 30 is available at the first output (terminals 124, 126). The polarity is positive at terminal 122 with respect to terminal 120 when the voltage of the battery 30 is available at the second output (terminals 120, 122). The relay 100 is of the type in which the prior output takes precedence so long as the voltage applied to its corresponding input is maintained. For example, if the voltage of the battery 30 is applied to the first input (terminals 112, 114) and maintained, then the voltage of the battery 30 remains available at the first output (terminals 124, 126) and no voltage can appear at the second output (terminals 120, 122) even if the voltage of the battery 30 is applied to the second input (terminals 116, 118). The first output (terminals 124, 126) has priority over the second output (terminals 120, 122) so long as the voltage of the battery 30 remains applied to the first input (terminals 112, 114).

The stepping relay 100 is in a circuit with the set 62 of conductor strips. Each strip of the set 62 of conductor strips is constructed of an electrically conductive material, such as copper. The set 62 of conductor strips includes strips 134, 136, each made from one single, continuous piece of conductive material. The set 62 of conductor strips also includes a strip 138 which is divided into two separate segments 140 and 142. Each segment 140, 142 is electrically insulated from the other. The set 62 of conductor strips further includes a strip 144 which is divided into three separate segments 146, 148 and 150. Each segment 146, 148, 150 is electrically insulated from the other segments.

Each of the strips 134, 136, 138, 144 is associated with a brush on the brush holder 66. Strips 134 and 138 are associated with brushes 152 and 154, respectively. The brushes 152 and 154 move together along strips 134, 138 and are connected to provide electrical continuity continuously between strips 134 and 138. Thus, when brush 154 engages segment 142, electrical continuity is provided between segment 142 and strip 134, and when brush 154 engages segment 140, electrical continuity is provided between segment 140 and strip 134.

Strips 136 and 144 are associated with brushes 156 and 158, respectively. The brushes 156 and 158 move together along strips 136, 144 and are connected to provide electrical continuity continuously between strips 136 and 144. Thus, when brush 158 engages segment 150, electrical continuity is provided between segment 150 and strip 136, and when brush 158 engages segment 148, electrical continuity is provided between segment 148 and strip 136. Similarly, when brush 158 engages segment 146, electrical continuity is provided between segment 146 and strip 136.

As the brushes 152, 154, 156, 158 move along their respective strips 134, 138, 136, 144, the brushes move in unison. For example, when the set 60 of brushes are at the left end of the set 62 of conductor strips, as indicated by a region 159, the brush 154 is in contact with segment 140 and brush 158 is in contact with segment 146. Brushes 152 and 156 are always in contact with strips 134 and 136, respectively. When the set 60 of brushes are at the right end of the set 62 of conductor strips, as indicated by a region 161, brush 154 is in contact with segment 142 and brush 158 is in contact with segment 150. In a region 160, brush 154 engages segment 140 and brush 158 engages segment 148. Similarly, in a region 162, the brush 154 engages segment 142 and brush 158 engages segment 148.

Thus, four separate and distinct electrical configurations are possible when the set 60 of brushes engage their respective strips. These four electrical configurations are defined by the four regions 159, 160, 162, 161. In region 159, electrical continuity is established between strip 134 and segment 140 of strip 138, and electrical continuity is established between strip 136 and segment 146 of strip 144. In region 160, electrical continuity is established between strip 134 and segment 140 of strip 138, and electrical continuity is established between strip 136 and segment 148 of strip 144. In region 162, electrical continuity is established between strip 134 and segment 142 of strip 138, and electrical continuity is established between strip 136 and segment 148 of strip 144. In region 161, electrical continuity is established between strip 134 and segment 142 of strip 138, and electrical continuity is established between strip 136 and segment 150 of strip 144.

Segment 150 is connected to one terminal of the time delay device 108. Segment 148 is connected to the trigger input of the time delay device 110. The strip 136 is connected to the positive terminal of the battery 30. The strip 134 is connected to terminal 122 of the relay 100. Segment 142 is connected to one terminal of the motor 26, to terminal 124 of the relay 100, to one contact terminal of the switch 106, and to one contact terminal of the switch 104. Segment 140 is connected to the control input terminal of the switch 106.

One terminal of the motor 26, as described hereinabove, is connected to the segment 142. The other terminal of the motor 26 is connected to one contact terminal of switch 102, and to terminal 120 of the relay 100. The other contact terminal of switch 102 is connected to terminal 126 of the relay 100. The control input terminal of the switch 102 is connected to one terminal of the time delay device 110. The other terminal of the time delay device 110 is connected to terminal 114 of the relay 100. The time delay device 110 has two power input terminals. One input terminal is connected to the positive terminal of the battery 30 and the other power input terminal is connected to electrical ground.

The one contact terminal of the switch 106 which is connected to segment 142 is also connected to one contact terminal of the switch 104. The other contact terminal of the switch 106 is connected to terminal 118 of the relay 100. The control input terminal of the switch 104 is connected to the Hall effect sensor 50. The other contact terminal of the switch 104 is connected to the other terminal of the time delay device 108. The time delay device 108 has two power input terminals. One power input terminal is connected to the positive terminal of the battery 30 and the other power input terminal is connected to electrical ground.

Before the occupant initially withdraws the webbing 12 to buckle it, all of the brushes are in region 161. In region 161, the brushes 156 and 158 electrically connect strip 136 and segment 150. Brushes 152 and 154 electrically connect strip 134 and segment 142. The magnet 47 is at the limit stop 46. The switch 104 and the switch 102 are each open. Switch 106 is closed.

When the occupant initially withdraws the webbing 12 to buckle the webbing 12, the holder arm 42 pivots about the extended portion 41 of the spool 40. When the holder arm 42 pivots about the extended portion 41 of the spool 40, the magnet 47 moves toward the Hall effect sensor 50. When the magnet 47 reaches the limit stop 48, the sensor 50 provides an electrical signal to close switch 104.

Also, at the moment the occupant initially withdraws the webbing 12 to buckle it, an increasing tension force acts on the webbing 12 in the belt withdrawal direction 13. This increasing tension force moves the worm 54 and the brush holder 56 against the bias of spring 58. The spring 58 compresses. The worm 54 slides axially and the set 60 of brushes in the brush holder 56 move across the set 62 of conductor strips. The amount of axial sliding of the worm 54 along the shaft 18 varies in direct response to the tension force acting on the webbing 12.

When the tension force acting on the webbing 12 increases above a first predetermined force, the brush 158 engages segment 148. Thus, an electrical connection is provided between segment 148 and strip 136. When this occurs, the voltage of the battery 30 is applied to the first input (terminals 112, 114) of relay 100. The voltage of the battery 30 is thereby provided at the first output (terminals 124, 126) of the relay 100. The normally-open switch 102 closes in response to the brush 158 engaging segment 148.

When switch 102 closes, terminal 126 of relay 100 is connected to the motor 26. The motor is actuated to rotate the spool 40 in the belt withdrawal direction 13. The motor 26 continues to rotate the spool 40 in the belt withdrawal direction 13 so long as the tension force acting on the webbing 12 is maintained above the first predetermined amount of force. Actuation of the motor 26 to rotate the spool 40 in the belt withdrawal direction 13 during the buckling process provides the occupant with motorized assist of withdrawal of the webbing 12. The result is that the occupant does not have to overcome the inertia of the motor 26 in order to move the webbing 12 in the belt withdrawal direction 13 during the buckling process.

After the webbing 12 is buckled and the withdrawal force on the webbing 12 is relieved, the bias of the spring 58 urges the worm 54 and the brush holder 56 back to region 161. As the set 60 of brushes moves to the right, the brush 158 eventually disengages segment 148 and engages segment 150 of strip 144. When the brush 158 engages segment 150, electrical current does not flow immediately through the switches 104, 106 to terminal 118 of the relay 100. Current does not flow because the time delay device 108 acts to block current flow through the switches 104, 106 to terminal 118 of the relay 100 until after elapse of a first predetermined time delay from the moment the brush 158 engaged segment 150. Current flows through the switches 104, 106 to terminal 118 of the relay 100 only after elapse of the first predetermined time delay from the moment the brush 158 engaged segment 150. After the first predetermined time delay elapses, the positive terminal of the battery 30 is connected to terminal 118 of the relay 100 through the strip 136, the brushes 156 and 158, the segment 150, the time delay device 108, the switch 104, and the switch 106. The voltage of the battery 30 is thereby provided at the second output (terminals 120, 122) of relay 100.

The voltage of the battery 30 provided at the second output (terminals 120, 122) is connected to the motor 26 with reversed polarity through terminal 120 of the relay 100 and through terminal 122 of the relay 100, the strip 134, the brushes 152 and 154, and the segment 142. The motor 26 is actuated to rotate the spool 40 in the belt retraction direction 15. The webbing 12 moves in the belt retraction direction and begins to tighten against the occupant. The first predetermined time delay of the time delay device 108 is selected so that a sufficient amount of time is provided for the occupant to buckle the webbing 12 before the motor 26 is actuated to rotate the spool 40 in the belt retraction direction 15. The first predetermined time delay is adjustable and is approximately a few seconds, preferably four seconds. Thus, the occupant is provided time to buckle the webbing 12 before the webbing 12 begins to tighten against the occupant.

After the webbing 12 begins to tighten against the occupant, the webbing 12 continues to tighten until the webbing 12 cannot retract any farther due to the tightness of the webbing 12 against the occupant. When this occurs, the worm 54 tries to continue to rotate. As the worm 54 tries to rotate, the worm 54 threads itself on the worm wheel 52. This causes movement of the worm 54 and the brush holder 56 toward region 160 of the set 62 conductor strips. As the set 60 of brushes moves toward region 160, the brush 158 leaves segment 150 and engages segment 148. When the brush 158 engages segment 148, the voltage of the battery 30 is applied to the first input (terminals 112, 114).

The voltage which was previously applied to the second input (terminals 116, 118) is maintained as the brush 158 leaves segment 150 and engages segment 148. The electrical connection maintaining the voltage applied to the second input (terminals 116, 118) is from terminal 122 of the relay 100 through the strip 134, the brushes 152 and 154, the segment 142, and the switch 106, to terminal 118 of the relay 100. So long as this voltage applied to the second input (terminals 116, 118) is maintained, the voltage of the battery 30 remains available at the second output (terminals 120, 122). Thus, although the brush 158 engages segment 148 to apply the voltage of the battery 30 to the first input (terminals 112, 114) as the worm 54 and the brush 65 holder 56 are moving toward region 160, the voltage of the battery 30 is not provided at the first output (terminals 124, 126). This occurs because the relay 100 is of the type, as described hereinabove, in which the prior output takes precedent so long as the voltage applied to its corresponding input is maintained.

Eventually, the brush 154 leaves segment 142 and engages segment 140. The set 60 of brushes move into region 160. When this occurs, the switch 102 closes and the switch 106 opens. The voltage of the battery 30 at the second input (terminals 116, 118) of relay 100 is removed when the switch 106 opens. The voltage at the second output (terminals 120, 122) is thereby removed. In region 160, the voltage of the battery 30 is applied to the first input (terminals 112, 114) of relay 100. Thus, when the set 60 of brushes move into region 160, the voltage at the second output (terminals 120, 122) is removed and the voltage at the first output (terminals 124, 126) becomes available. The voltage of the battery 30 at the first output (terminals 124, 126) of the relay 100 is connected to the motor 26. The motor 26 is actuated to rotate the spool 40 in the belt withdrawal direction 13. The tightness of the webbing 12 against the occupant begins to ease. The bias of the spring 58 urges the worm 54 and the brush holder 56 to move back toward region 161 of the set 62 of conductor strips. The motor 26 continues to rotate the spool 40 in the belt withdrawal direction 13 until the brush 158 disengages segment 148.

When the brush 158 disengages segment 148, the current flow from the positive terminal of the battery 30 through the conductor strip 136, the brushes 156, 158, the segment 148, and the time delay device 110 to the control input terminal of the switch 102 is interrupted. However, the time delay device 110 generates electrical current and continues to supply current to control input terminal of the switch 102 until elapse of a second predetermined time delay. When the brush 158 disengages segment 148 and the second predetermined time delay provided by the time delay device 110 has elapsed, the switch 102 opens to remove the voltage applied to the motor 26. At the same time, the voltage applied to the first input (terminals 112, 114) of the relay 100 is removed. The voltage at the first output (terminals 124, 126) of the relay 100 is thereby removed and the motor 26 deactuates. The motor 26 does not deactuate until after elapse of the second predetermined time delay from the moment the brush 158 disengaged segment 148. The result is a slight pay out of the webbing 12 after tightening of the webbing 12 against the occupant.

Should the brush 158 disengage segment 148 too quickly as the worm 54 and the brush holder 56 move toward region 161, the motor 26 may not be actuated long enough to rotate the spool 40 in the belt withdrawal direction 13 so as to pay out a desired amount of the webbing 12. The use of the time delay device 110 insures that the motor 26 rotates the spool 40 in the belt withdrawal direction 13 for a predetermined amount of time. This predetermined amount of time is equal to the second predetermined time delay provided by the timing device 110. The second predetermined time delay provided by the timing device 110 is adjustable and is preferably 0.15 seconds. Thus, even if the brush 158 disengages segment 148 too quickly, the motor 26 continues to rotate the spool 40 in the belt withdrawal direction 13 until the desired amount of the webbing 12 is paid out.

While the webbing 12 is buckled and the webbing 12 is wrapped around the occupant, the occupant might move from a normally-seated position to a position which causes movement of the webbing 12 in the belt withdrawal direction 13. Movement of the webbing 12 in the belt withdrawal direction 13 occurs, for example, if the occupant leans forward to adjust the radio. If this occurs and the first predetermined time delay is not provided by the time delay device 108, then excess slack in the webbing 12 forms when the occupant returns to the normally-seated position. The excess slack in the webbing 12 forms because the motor 26 is actuated to rotate the spool 40 in the belt retraction direction 15 almost immediately after the occupant leans forward. The slack in the webbing 12 sets with the occupant in a leaned forward position. When the occupant moves back to the normally-seated position, the webbing 12 remains in the same position leaving an excess amount of slack in the webbing 12. However, by using the time delay device 108, the motor 26 actuates to rotate the spool 40 in the belt retraction direction 15 only after elapse of the first predetermined time delay. This time delay gives time for the occupant to return to the normally-seated position before the motor 26 is actuated to rotate the spool 40 in the belt retraction direction 15.

These movements of the occupant which cause excess slack in the webbing 12 are sensed in the same way as an initial withdrawal of the webbing 12 is sensed. The only requirement is that a sufficient force be exerted on the webbing 12 while the occupant is moving so that the worm 54 and the brush holder 56 move into region 162. When the worm 54 and the brush holder 56 move into region 162, the motor 26 is actuated to rotate the spool 40 in the belt withdrawal direction 13 in the manner previously described. The sequence of retracting the webbing 12 against the occupant and paying out the small amount of webbing, as previously described, is then repeated. Thus, the movements of the occupant are being tracked, and any excess slack formed in the webbing 12 is being continuously removed.

In the event of a crash, the weight of the occupant moves against the webbing 12. An increasing tension force acts on the webbing 12 in the belt withdrawal direction 13 due to the weight of the occupant moving against the webbing 12. The increasing tension force acting on the webbing 12 moves the worm 54 and the brush holder 56 against the bias of the spring 58. The set 60 of brushes moves towards region 159. When the velocity of the webbing 12 in the belt withdrawal direction 13 exceeds a predetermined velocity, the set 60 of brushes moves into region 159. This predetermined velocity is a function of the characteristics of the spring 58 and a function of the manner of meshing engagement between the worm 54 and the worm wheel 52. When the set 60 of brushes moves into region 159, the motor 26 is not actuated.

At the time of the crash, the meshing engagement of the worm 54 and the worm wheel 52 prevents the worm wheel 54 and the spool 40 from rotating. This occurs because of the helix angle of the worm 54 and the pressure angle of the worm 54 engaging with the worm wheel 52. The helix angle of the worm 54 is less than five degrees. The pressure angle of the worm 54 engaging with the worm wheel 52 is greater than fifteen degrees. Thus, when a crash occurs, the retractor 14 locks and movement of the webbing 12 in the belt withdrawal direction 13 is prevented.

It should be apparent from the above that the arrangement of the worm 54 and the brush holder 56 with the set 60 of brushes movable across the segments of the set 62 of conductor strips is akin to a slidable switch with four switch positions. Each switch position corresponds to the set 60 of brushes being in one of the four regions 159, 160, 162, 161. Switching occurs when the set 60 of brushes is moved between the regions in direct response to tension force applied to the belt webbing.

Figure 8:
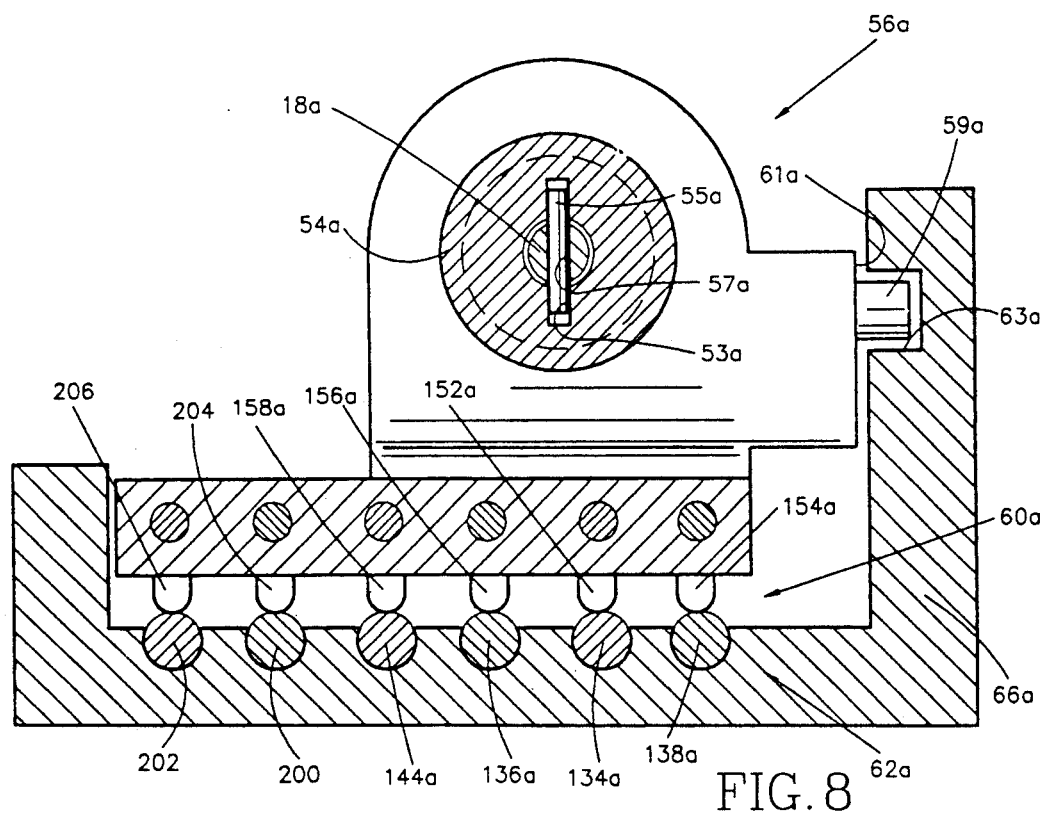
FIG. 8 is a view similar to FIG. 5 but illustrating additional parts constructed in accordance with a second embodiment of the electronic control circuit.
Figure 9:
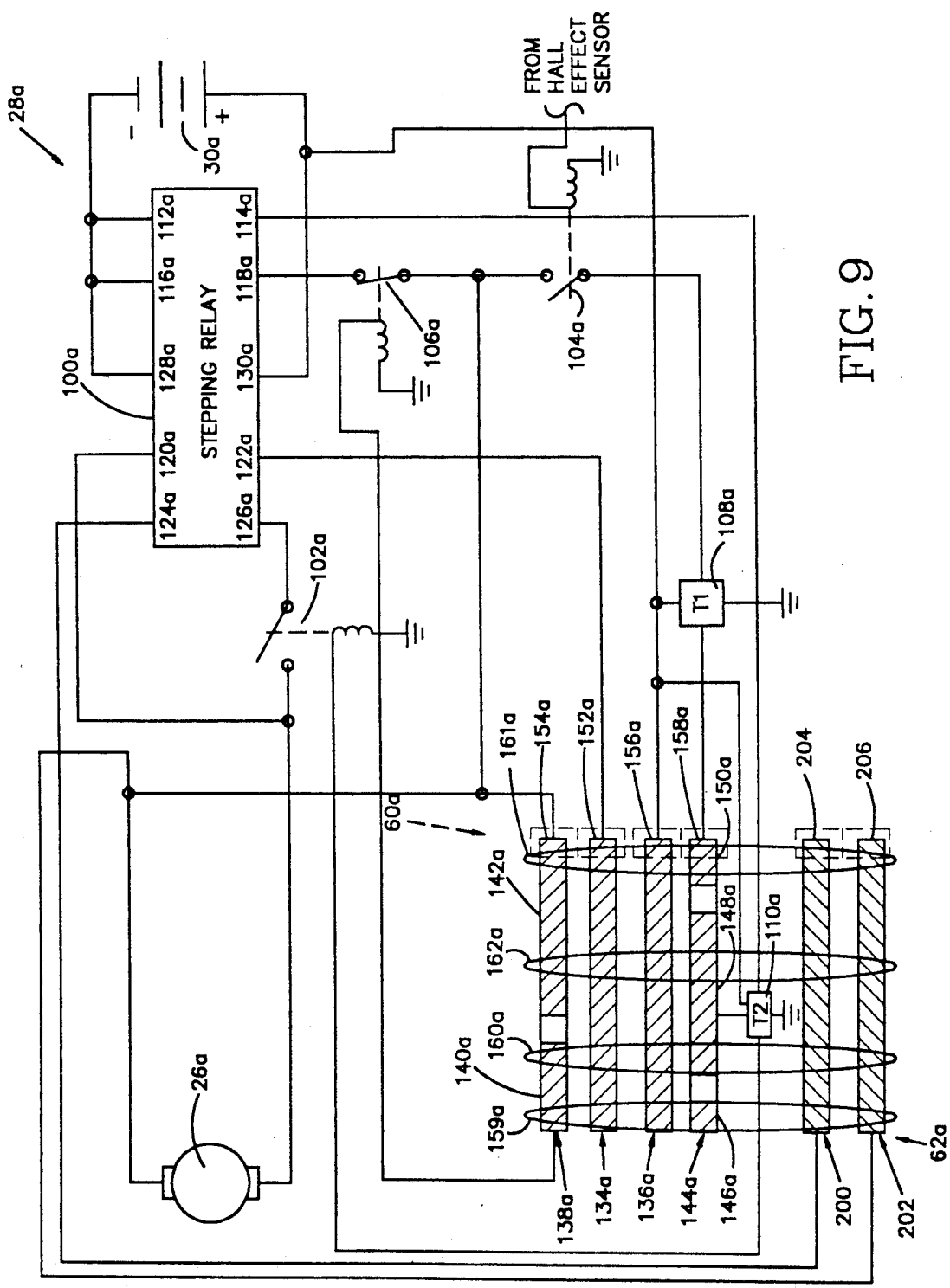
FIG. 9 is a schematic diagram illustrating the second embodiment of the electronic control circuit incorporating the additional parts as shown in FIG. 8.

In the embodiment of the present invention as illustrated in FIGS. 5 and 7, the speed of the motor 26 is constant when actuated by the control circuit 28 to turn the spool 40 in the belt withdrawal direction 13. It is contemplated that it may be desirable to vary the speed of the motor to rotate the spool 40 in the belt withdrawal direction 13. A control circuit for so controlling the motor is illustrated in FIGS. 8 and 9. Since the control circuit illustrated in FIGS. 8 and 9 is generally similar to the control circuit illustrated in FIGS. 5 and 7, similar numerals are utilized to designate similar components, the suffix letter "a" being added to the numerals associated with the control circuit of FIGS. 8 and 9.

The control circuit 28a further includes two electrical resistor strips 200, 202 mounted on the brush holder 56a. The resistor strip 200 is electrically connected to terminal 124a of the relay 100a. Terminal 124a is not electrically connected to other points in the control circuit 28a. The resistor strip 202 is electrically connected to the junction between the motor 26a and segment 142a.

An electrical brush 204 is movable along the resistor strip 200. An electrical brush 206 is movable along the resistor strip 202. The two brushes 204, 206 move along their respective resistor strips 200, 202 in a manner identical to that of the set 60a of brushes moving along their respective conductor strips. The two brushes 204, 206 move together along resistor strips 200, 202 and are connected to provide electrical continuity continuously between the strips 200, 202. The set 60a of brushes and the two brushes 204, 206 move as a unit along their respective conductor strips or resistor strips, as the case may be. The two resistor strips 200, 202 and the two brushes 204, 206 provide a rheostat for regulating current flow to the motor 26a.

When the two brushes 204, 206 are in the rightmost portion of region 161a, the resistance to current flow to the motor 26a is at a maximum. As the two brushes 204, 206 move from region 161a toward region 159a, the resistance to current flow to the motor 26a decreases. When the two brushes 204, 206 are in the leftmost portion of region 159a, the resistance to current flow to the motor 26a is at a minimum. The current flow to the motor 26a increases as the resistance decreases. The speed of the motor 26a increases as the current flow thereto increases. Thus, the speed of the motor 26a increases as the two brushes 204, 206 move from region 161a toward region 159a.

When the occupant withdraws the webbing 12a with a minimum amount of force to buckle the webbing 12a, the two brushes 204, 206 move into the right portion of region 162a. If the occupant applies a greater force while withdrawing the webbing 12a, then the two brushes 204, 206 tend to move toward the left portion of the region 162a. As the two brushes 204, 206 move toward the left portion of the region 162a, the speed of the motor 26a increases. Thus, as the withdrawal force applied to withdraw the webbing 12a increases, the speed of the motor 26a increases. The speed of the motor 26a, and hence the amount of motorized assist, is proportional to the withdrawal force applied to the webbing 12a. The proportionality between the speed of the motor 26a and the withdrawal force applied to the webbing 12a provides the occupant with an improved feel of the webbing 12a while buckling the webbing 12a.

This invention has been described with reference to preferred embodiments. Modifications and alterations may become apparent to one skilled in the art upon reading and understanding this specification. It is intended to include all such modifications and alterations within the scope of the appended claims.

Having described a specific preferred embodiment of the invention, the following is claimed:

1. A seat belt retractor for use by an occupant of a vehicle, said seat belt retractor comprising:
   a rotatable spool with belt webbing wound around said spool, said spool being rotatable in a belt withdrawal direction and in a belt retraction direction, said spool rotating in the belt withdrawal direction to enable the belt webbing to be extended around the occupant, said spool rotating in the belt retraction direction to enable the belt webbing to be tightened against the occupant;
   a motor for rotating said spool;
   detector means for detecting a tension force applied to the belt webbing and for providing a first signal when the tension force initially applied to the belt webbing increases above a first predetermined amount of force; and
   actuator means for actuating said motor to rotate said spool in the belt withdrawal direction in response to said first signal.

2. The seat belt retractor of claim 1 further including a worm wheel fixed to and rotatable with said spool, an axially slidable worm in meshing engagement with said worm wheel, and means for supporting said worm for rotation about its longitudinal axis and for axial sliding movement along its longitudinal axis, said motor being drivingly connected to said spool by said supporting means, said worm, and said worm wheel, said worm being axially slidable along its longitudinal axis in response to tension force applied to the belt webbing.

3. The seat belt retractor of claim 2 wherein said detector means includes an electrical brush holder movable axially with said worm, a plurality of electrical brushes mounted on said electrical brush holder, a plurality of electrical conductor strips having a plurality of electrical segments electrically coupled to said plurality of electrical brushes, said plurality of electrical segments being connected to said plurality of brushes in a first arrangement to provide said first signal when said worm axially moves to a first predetermined axial position, said plurality of electrical segments being connected to said plurality of brushes in a second arrangement to provide said second signal when said worm moves to a second predetermined axial position, said plurality of electrical segments being connected to said plurality of brushes in a third arrangement to provide said third signal when said worm moves to a third predetermined axial position.

4. The seat belt retractor of claim 1 further including means for blocking rotational movement of said spool in the belt withdrawal direction in response to the belt webbing moving at a velocity exceeding a predetermined velocity in a direction to rotate said spool in the belt withdrawal direction.

5. The seat belt retractor of claim 18 wherein the helix angle of said worm is less than five degrees and the pressure angle of said worm engaging with said worm wheel is greater than fifteen degrees, the meshing engagement of said worm with said worm wheel preventing rotational movement of said worm wheel and said spool after said worm moves to said predetermined position.

6. A seat belt retractor for use by an occupant of a vehicle, said seat belt retractor comprising:
   a rotatable spool with belt webbing wound around said spool, said spool being rotatable in a belt withdrawal direction and in a belt retraction direction, said spool rotating in the belt withdrawal direction to enable the belt webbing to be extended around the occupant, said spool rotating in the belt retraction direction to enable the belt webbing to be tightened against the occupant; and
   means for blocking rotational movement of said spool in the belt withdrawal direction in response to the belt webbing moving at a velocity exceeding a predetermined velocity in a direction to rotate said spool in the belt withdrawal direction;
   said blocking means including a worm wheel fixed to said spool for rotation with said spool, a worm in meshing engagement with said worm wheel, and means for supporting said worm for rotation about its longitudinal axis and for axial movement along its longitudinal axis in response to tension force applied to the belt webbing.

7. The seat belt retractor of claim 6 further including an electric motor drivingly connected to said spool by said supporting means, said worm, and said worm wheel for rotating said spool in the belt retraction direction and for rotating said spool in the belt withdrawal direction to pay out an amount of belt webbing.

8. The seat belt retractor of claim 19 further including actuator means for actuating said motor to rotate said spool in the belt withdrawal direction in response to said detector means providing said first signal to pay out said amount of webbing.

9. A seat belt retractor for use by an occupant of a vehicle, said seat belt retractor comprising:
   a rotatable spool with belt webbing stored on said spool, said spool being rotatable in a belt withdrawal direction and in a belt retraction direction, said spool rotating in the belt withdrawal direction to enable the belt webbing to be withdrawn from its stored condition to extend around the occupant;
   a motor for rotating said spool in the belt withdrawal direction as the belt is withdrawn from its stored condition;
   detector means for detecting when a tension force applied to the belt webbing increases above a predetermined amount of force during withdrawal of the seat belt webbing from the stored condition, said detector means providing a signal when the tension force applied to the belt webbing increases above said predetermined amount of force; and
   actuator means for actuating said motor to rotate said spool in the belt withdrawal direction in response to said detector means providing said signal, thereby providing motorized assist of withdrawal of the belt webbing from its stored condition.

10. The seat belt retractor of claim 9 further including means for blocking rotational movement of said spool in the belt withdrawal direction in response to the belt webbing moving at a velocity exceeding a predetermined velocity in a direction to rotate said spool in the belt withdrawal direction.

11. The seat belt retractor of claim 9 wherein said actuator means includes means for varying the rotational speed of said motor in the belt withdrawal direction, the rotational speed of said motor when it is rotating said spool in the belt withdrawal direction increasing as the tension force applied to the belt webbing increases.

12. A seat belt retractor for use by an occupant of a vehicle, said seat belt retractor comprising:
 a rotatable spool with belt webbing wound around said spool, said spool being rotatable in a belt withdrawal direction and in a belt retraction direction, said spool rotating in the belt withdrawal direction to enable the belt webbing to be extended around the occupant, said spool rotating in the belt retraction direction to enable the belt webbing to be tightened against the occupant;
 a motor for rotating said spool;
 switch means having a member slidable between a plurality of positions in response to varying tension applied to the belt webbing, each of said positions corresponding to a different amount of tension force applied to the belt webbing; and
 control means for providing a control signal in each position of said slidable member for either (i) actuating said motor to rotate said spool in either the belt withdrawal direction or the belt retraction direction or (ii) deactuating the motor.

13. The seat belt retractor of claim 12 further including a worm wheel fixed to and rotatable with said spool, said slidable member being a worm in meshing engagement with said worm wheel, and means for supporting said worm for rotation about its longitudinal axis and for axial sliding movement along its longitudinal axis, said motor being drivingly connected to said spool by said supporting means, said worm, and said worm wheel, said worm being axially slidable between said plurality of positions along its longitudinal axis in response to tension force applied to the belt webbing.

14. The seat belt retractor of claim 21 wherein the helix angle of said worm is less than five degrees and the pressure angle of said worm engaging with said worm wheel is greater than fifteen degrees, the meshing engagement of said worm with said worm wheel preventing the rotational movement of said worm wheel and said spool after said worm moves to a predetermined position in response to the belt webbing moving at a velocity exceeding a predetermined velocity to rotate said spool in the belt withdrawal direction.

15. The seat belt retractor of claim 21 wherein said motor is a variable speed motor, the speed of the motor varying directly as a function of the current flowing to said motor through at least one of said plurality of electrical conductor strips, said one of said plurality of electrical conductor strips being a resistive strip, the current flow to said variable speed motor being a minimum when the electrical brush associated with said resistive strip is at one end of said resistive strip and being a maximum when the electrical brush is at the other end of said resistive strip, the current flow to said variable speed motor increasing as the brush moves from the one end to the other end of said resistive strip.

16. A seat belt retractor for use by an occupant of a vehicle, said seat belt retractor comprising:
 a rotatable spool with belt webbing stored on said spool, said spool being rotatable in a belt withdrawal direction and in a belt retraction direction, said spool rotating in the belt withdrawal direction to enable the belt webbing to be withdrawn from its stored condition to extend around the occupant;
 a motor for rotating said spool in the belt withdrawal direction as the belt is withdrawn from its stored condition; and
 actuator means for actuating said motor to rotate said spool in the belt withdrawal direction in response to tension force applied to the belt webbing, the rotational speed of said motor to rotate said spool in the belt withdrawal direction varying as a function of the tension force applied to the belt webbing.

17. A seat belt retractor for use by an occupant of a vehicle, said seat belt retractor comprising:
 a rotatable spool with belt webbing wound around said spool, said spool being rotatable in a belt withdrawal direction and in a belt retraction direction, said spool rotating in the belt withdrawal direction to enable the belt webbing to be extended around the occupant, said spool rotating in the belt retraction direction to enable the belt webbing to be tightened against the occupant;
 a motor for rotating said spool in the belt retraction direction;
 detector means for detecting a tension force applied to the belt webbing and for providing a first signal when the tension force initially applied to the belt webbing increases above a first predetermined amount of force;
 actuator means for actuating said motor to rotate said spool in the belt withdrawal direction in response to said first signal; and
 said detector means providing a second signal when the tension force applied to the belt webbing decreases below said first predetermined amount of force and a third signal when the tension force applied to the belt webbing decreases below a second predetermined amount of force, said actuator means actuating said motor to rotate said spool in the belt retraction direction after elapse of a first predetermined amount of time in response to said detector means providing said third signal, said actuator means actuating said motor to rotate said spool in the belt withdrawal direction for a second predetermined amount of time to pay out an amount of webbing in response to said detector means providing said second signal.

18. A seat belt retractor for use by an occupant of a vehicle, said seat belt retractor comprising:
 a rotatable spool with belt webbing wound around said spool, said spool being rotatable in a belt withdrawal direction and in a belt retraction direction, said spool rotating in the belt withdrawal direction to enable the belt webbing to be extended around the occupant, said spool rotating in the belt retraction direction to enable the belt webbing to be tightened against the occupant;
 a motor for rotating said spool in the belt retraction direction;
 detector means for detecting a tension force applied to the belt webbing and for providing a first signal when the tension force initially applied to the belt webbing increases above a first predetermined amount of force;
 actuator means for actuating said motor to rotate said spool in the belt withdrawal direction in response to said first signal;
 means for blocking rotational movement of said spool in the belt withdrawal direction in response to the belt webbing moving at a velocity exceeding a predetermined velocity in a direction to rotate said spool in the belt withdrawal direction; and said blocking means includes a worm wheel fixed to said spool for rotation with said spool, a worm in meshing engagement with said worm wheel, and means for supporting said worm for rotation about its longitudinal axis and for axial movement along its longitudinal axis, said motor being operatively connected to said spool through said supporting means, said worm, and said worm wheel, said worm being axially movable along its longitudinal axis in response to tension force applied to the belt webbing, said worm axially moving to a predetermined position and preventing further rotational movement of said worm wheel and said spool in response to the belt webbing moving at a velocity exceeding said predetermined velocity in a direction to rotate said spool in the belt withdrawal direction.

19. A seat belt retractor for use by an occupant of a vehicle, said seat belt retractor comprising:
   a rotatable spool with belt webbing wound around said spool, said spool being rotatable in a belt withdrawal direction and in a belt retraction direction, said spool rotating in the belt withdrawal direction to enable the belt webbing to be extended around the occupant, said spool rotating in the belt retraction direction to enable the belt webbing to be tightened against the occupant;
   means for blocking rotational movement of said spool in the belt withdrawal direction in response to the belt webbing moving at a velocity exceeding a predetermined velocity in a direction to rotate said spool in the belt withdrawal direction;
   said blocking means including a worm wheel fixed to said spool for rotation with said spool, a worm in meshing engagement with said worm wheel, and means for supporting said worm for rotation about its longitudinal axis and for axial movement along its longitudinal axis in response to tension force applied to the belt webbing;
   an electric motor drivingly connected to said spool by said supporting means, said worm, said worm wheel for rotating said spool in the belt retraction direction and for rotating said spool in the belt withdrawal direction to pay out an amount of belt webbing; and
   detector means for detecting when tension force applied to the belt webbing increases above or decreases below a first predetermined amount of force and for detecting when tension force applied to the belt webbing decreases below a second predetermined amount of force, said detector means providing a first signal when the tension force applied to the belt webbing increases above said first predetermined amount of force, a second signal when the tension force applied to the belt webbing decreases below said first predetermined amount of force, and a third signal when the tension force applied to the belt webbing decreases below said second predetermined amount of force.

20. A seat belt retractor for use by an occupant of a vehicle, said seat belt retractor comprising:
   a rotatable spool with belt webbing stored on said spool, said spool being rotatable in a belt withdrawal direction and in a belt retraction direction, said spool rotating in the belt withdrawal direction to enable the belt webbing to be withdrawn from its stored condition to extend around the occupant;
   a motor for rotating said spool in the belt withdrawal direction as the belt is withdrawn from its stored condition;
   detector means for detecting when a tension force applied to the belt webbing increases above a predetermined amount of force during withdrawal of the seat belt webbing from the stored condition, said detector means providing a signal when the tension force applied to the belt webbing increases above said predetermined amount of force;
   actuator means for actuating said motor to rotate said spool in the belt withdrawal direction in response to said detector means providing said signal, thereby providing motorized assist of withdrawal of the belt webbing from its stored condition;
   said actuator means includes means for varying the rotational speed of said motor in the belt withdrawal direction, the rotational speed of said motor when it is rotating said spool in the belt withdrawal direction increasing as the tension force applied to the belt webbing increases; and
   said means for varying the rotational speed of said motor includes a movable electrical brush electrically connected between two resistive strips electrically coupled to said motor, the current flow to said motor flowing through said resistive strips and said electrical brush and varying as a function of the position of said electrical brush along said resistive strips, the position of said electrical brush along said resistive strips varying as a function of the tension force applied to the belt webbing, the current flow to said motor increasing as the tension force applied to the belt webbing increases, the rotational speed of said motor to rotate said spool int the belt withdrawal direction increasing as the current flow to said motor increases.

21. A seat belt retractor for use by an occupant of a vehicle, said seat belt retractor comprising:
   a rotatable spool with belt webbing wound around said spool, said spool being rotatable in a belt withdrawal direction and in a belt retraction direction, said spool rotating in the belt withdrawal direction to enable the belt webbing to be extended around the occupant, said spool rotating in the belt retraction direction to enable the belt webbing to be tightened against the occupant;
   a motor for rotating said spool in the belt retraction direction;
   switch means having a member slidable between a plurality of positions in response to varying tension applied to the belt webbing, each of said positions corresponding to a different amount of tension force applied to the belt webbing;
   control means for providing a control signal in each position of said slidable member for either (i) actuating said motor to rotate said spool in either the belt withdrawal direction or the belt retraction direction or (ii) deactuating the motor;
   a worm wheel fixed to and rotatable with said spool, said slidable member being a worm in meshing engagement with said worm wheel, and means for supporting said worm for rotation about its longitudinal axis and for axial sliding movement along its longitudinal axis, said motor being drivingly connected to said spool by said supporting means, said worm, and said worm wheel, said worm being axially slidable between said plurality of positions along its longitudinal axis in response to tension force applied to the belt webbing; and said slidable member comprises an electrical brush holder movable axially with said worm and said control means comprises a plurality of electrical brushes mounted on said electrical brush holder and a plurality of electrical conductor strips along which said brushes slide, said plurality of electrical brushes sliding along segments of said plurality of conductor strips when said worm moves axially in response to tension applied to the belt webbing, said plurality of electrical brushes engaging a different arrangement of said segments of said plurality of conductor strips in each of said plurality of positions.

* * * * *

UNITED STATES PATENT AND TRADEMARK OFFICE
CERTIFICATE OF CORRECTION

PATENT NO. : 5,005,777

DATED : April 9, 1991

INVENTOR(S) : Angel Fernandez

It is certified that error appears in the above-identified patent and that said Letters Patent is hereby corrected as shown below:

Column 13, Line 64, Claim 5, change "18" to --1--.

Column 14, Line 32, Claim 8, delete "19" and insert --7--.

Column 15, Line 38, Claim 14, delete "21" and insert --12--, and

Line 48, delete "21" and insert --12--.

Column 17, Line 44, Claim 19, after "worm," insert --and--.

Signed and Sealed this

Eighth Day of December, 1992

Attest:

DOUGLAS B. COMER

Attesting Officer

Acting Commissioner of Patents and Trademarks